United States Patent
Mayer et al.

(10) Patent No.: US 9,275,120 B2
(45) Date of Patent: Mar. 1, 2016

(54) EASY QUERY

(75) Inventors: Martin Mayer, Durbach (DE); Zoltan Albrecht, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/483,653

(22) Filed: May 30, 2012

(65) Prior Publication Data

US 2013/0325793 A1     Dec. 5, 2013

(51) Int. Cl.
*G06F 17/30* (2006.01)

(52) U.S. Cl.
CPC .... *G06F 17/30566* (2013.01); *G06F 17/30545* (2013.01); *G06F 17/30569* (2013.01)

(58) Field of Classification Search
CPC ............... G06F 17/30545; G06F 17/30566; G06F 17/30569
USPC ........................................................ 707/603
See application file for complete search history.

(56) References Cited

U.S. PATENT DOCUMENTS

| | | | |
|---|---|---|---|
| 6,178,418 B1 * | 1/2001 | Singer | |
| 2004/0003132 A1 * | 1/2004 | Stanley et al. | 709/316 |
| 2007/0027829 A1 * | 2/2007 | Graf | 707/1 |
| 2008/0301086 A1 * | 12/2008 | Gupta | 707/2 |
| 2011/0093487 A1 * | 4/2011 | Le Biannic et al. | 707/765 |

* cited by examiner

*Primary Examiner* — Joshua Bullock
(74) *Attorney, Agent, or Firm* — Mintz Levin Cohn Ferris Glovsky and Popeo, P.C.

(57) ABSTRACT

A system and method for using an easy query in a business warehouse system environment that includes external end-user systems. A method includes providing a flag in a query to a business warehouse data system, the flag marking the query for access to the query by sources external to the business warehouse data system. The method further includes providing, by the at least one data processor the access points having a number of parameters that are fixed at a design time associated with the query, providing a query result to the access points of the sources external to the business warehouse system according to the number of parameters. The system and method provide an easy way of creating an access function at design time, as well as an easy way of result set consumption provided by the function at runtime.

15 Claims, 4 Drawing Sheets

EASY QUERY

TECHNICAL FIELD

The subject matter described herein relates to business warehouse analytics, and more particularly to a query system and method that enables a query to be remote enabled in an easy way.

BACKGROUND

A business warehouse system is a business information storage system that includes a database. The database typically requires a reporting tool with which a user can access and work with any type of document. For example, SAP AG of Walldorf Germany provides its own Business Warehouse (BW), which includes a reporting tool used to work with data in the BW database, called a Business Explorer (BEx). BEx has a Web-based user interface and is made up of two components, a BEx browser and a BEx analyzer.

The BEx browser provides an organized interface in the BW to documents such as workbooks, links, and BW Web reports. The BW database itself is segmented into discrete data areas called InfoCubes, which are made up of data and associated metadata. The BEx analyzer allows the user to examine segmented data in a variety of useful combinations, for example when comparing financial data for different fiscal years.

A database such as in SAP BW contains all the relevant data a customer needs for their analysis. To read and access this data, the customer creates and uses queries, such as BEx Queries. These queries are the basic element for various types of analysis. However, these queries are each a local object, which means it is only possible to work with them locally within the business warehouse system.

It is common behavior for companies to work with large system landscapes that have several servers and several business warehouse systems. Thus, there exists a need to combine data from different systems within a single application, as well as a need for a query protocol for receiving queries from a number of data consumers, including mobile devices.

SUMMARY

This document describes an Easy Query (EQ), i.e., a particular query that makes it possible to access data from a business warehouse system in an easy way. In a particular implementation, EQ makes it possible to consume BEx Queries directly from outside the BW landscape, e.g. with a mobile device. The system and method makes it possible to combine analytical from the BW landscape and transactional data from all other sources and different systems, within a single application like a mobile application or a dashboard.

In one aspect, a method includes providing, by at least one data processor, a flag in a query to a business warehouse data system, the flag marking the query for access to the query by sources external to the business warehouse data system. The method further includes providing, by the at least one data processor, a set of access points to the query according to the flag, the access points having a number of parameters that are fixed at a design time associated with the query. The method further includes providing, by the at least one data processor, a query result to the access points of the sources external to the business warehouse system according to the number of parameters.

In another aspect, a system includes an easy query function module that accesses a generic application programming interface (API) to retrieve a query result to a query to a business warehouse system from one of a number of end-user systems, and writes the query result in an end-user format into exporting parameters based on the end-user system. The easy query function module is further configured to provide the query result in an format that hides complexity and provides the query result in a consumable generic format.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, easy query can be fully integrated into existing systems, and must be maintained with a standard tool for query design, such as SAP's BEx Query designer. No additional software is needed. The easy query system and method offers a fully typed interface and a catalog of all queries which are available as easy queries. Easy query also provides remote consumption of data via a Web Service using a Simple Object Access Protocol (SOAP), a representational state transfer (REST) protocol, such as OData, or remote function call (RFC), which is a legacy ABAP access tool. Further, the easy query can be consumed with tools like MS Infopath or a dashboard application such as Xcelsius, or classic tools such as ABAP via RFC.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide an easy query (EQ), which enables a business warehouse system to expose proprietary queries to a consumer outside the system.

Implementations of an easy query system and method offers a fully typed interface, and a catalog of all queries which are available as EQs. The EQ system and method also provides remote consumption of data via a Web service, using a Simple Object Access Protocol (SOAP), or via OData, a REST based protocol, or via a remote function call (RFC), as will be shown in FIG. 1 and described below.

Based on queries flagged as an EQ, BW exposes analytical data for lightweight consumption. Using a gateway to access EQs, such as the SAP NetWeaver Gateway, it is possible to expose these as an open protocol services for mobile consumption, such as an OData protocol. OData is an open web protocol for querying and updating data. The protocol allows a consumer to query a data source over the HTTP protocol and get the result back in formats like Atom, JSON or plain XML, including pagination, ordering or filtering of the data.

Figure 1:
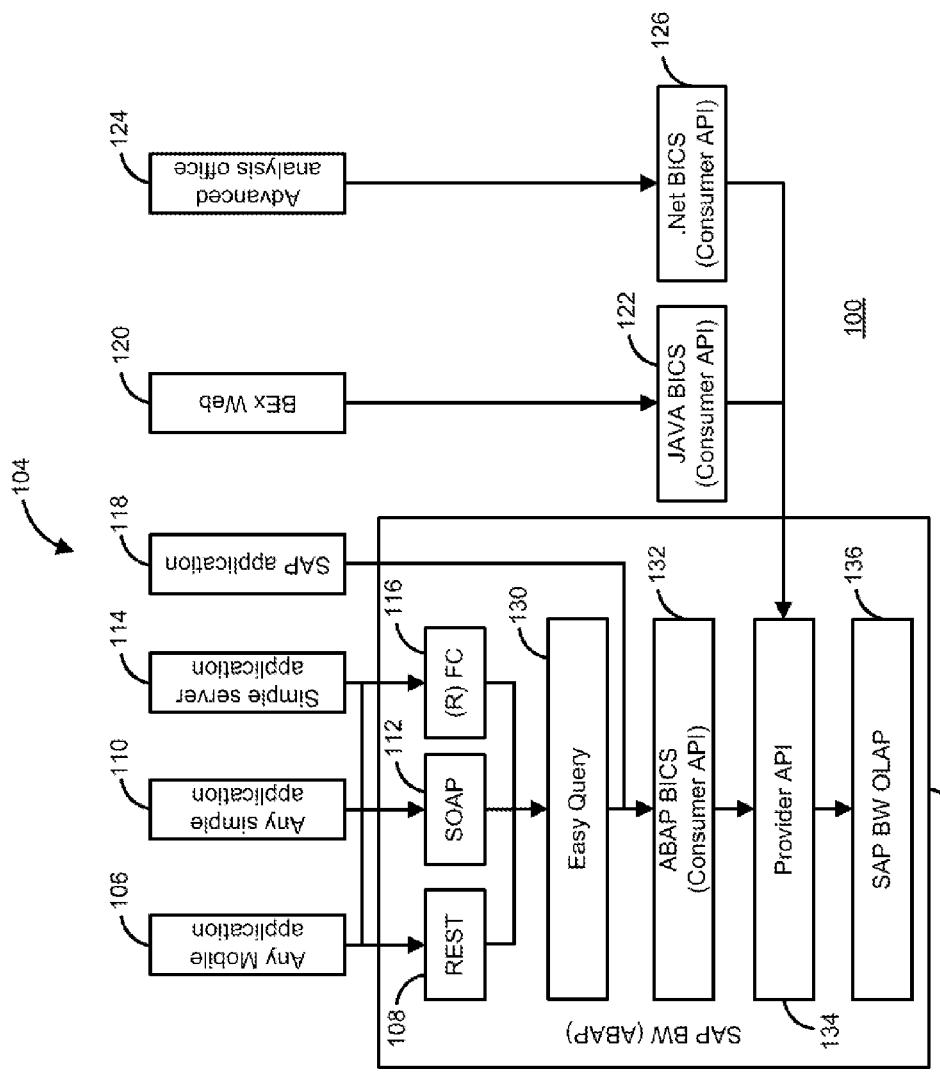
FIG. 1 is a diagram illustrating aspects of a system showing features consistent with implementations of the current subject matter.

FIG. 1 is a diagram illustrating aspects of a system 100 showing features consistent with implementations of the current subject matter. The system 100 includes a business warehouse system 102 for accessing data in response to queries from a number of different consumers 104 of the data. The consumers 104 can include, without limitation, a mobile application 106 that accesses the business warehouse system 102 via a representational state transfer (REST) 108 gateway server, a simple application 110 that accesses the business warehouse system 102 via a SOAP query interface 112, and a simple server application 114 that accesses the business warehouse system 102 via a function call interface 116, such as a remote function call (RFC) protocol. Any application (i.e. a mobile application, a dashboard or any other UI) can consume EQ via REST 108, SOAP 112 or RFC 116 depending on the way the customer prefers, and how the application or tool is able to use it.

The system 100 can also include a propriety business application 118, such as an SAP application, which normally would access the business warehouse system 102 via a proprietary query API and protocol such as ABAP BICS 132. The system 100 can further include BEx Web queries 120 that access the business warehouse system 102 via a consumer API such as JAVA BICS, or an advanced analysis office 124 that accesses the business warehouse system 102 via another consumer API such as .NET BICS 126.

In accordance with features consistent with implementations of the current subject matter, the system 100 includes an EQ module 130 that enables access to data from the business warehouse system 102, from an external query source or from the issuer of a certain query that is put upon a data provider, by combining data from different systems within a single application. The easy query provided by EQ module 130 provides an external interface for BEx query data in the BW landscape, and against which to easily build front-end visualization tools for different external systems. The EQ module 130 includes a function listing all Queries that are available as EasyQuery, which can be called upon designation or allowance of future queries as an EQ.

Figure 2:
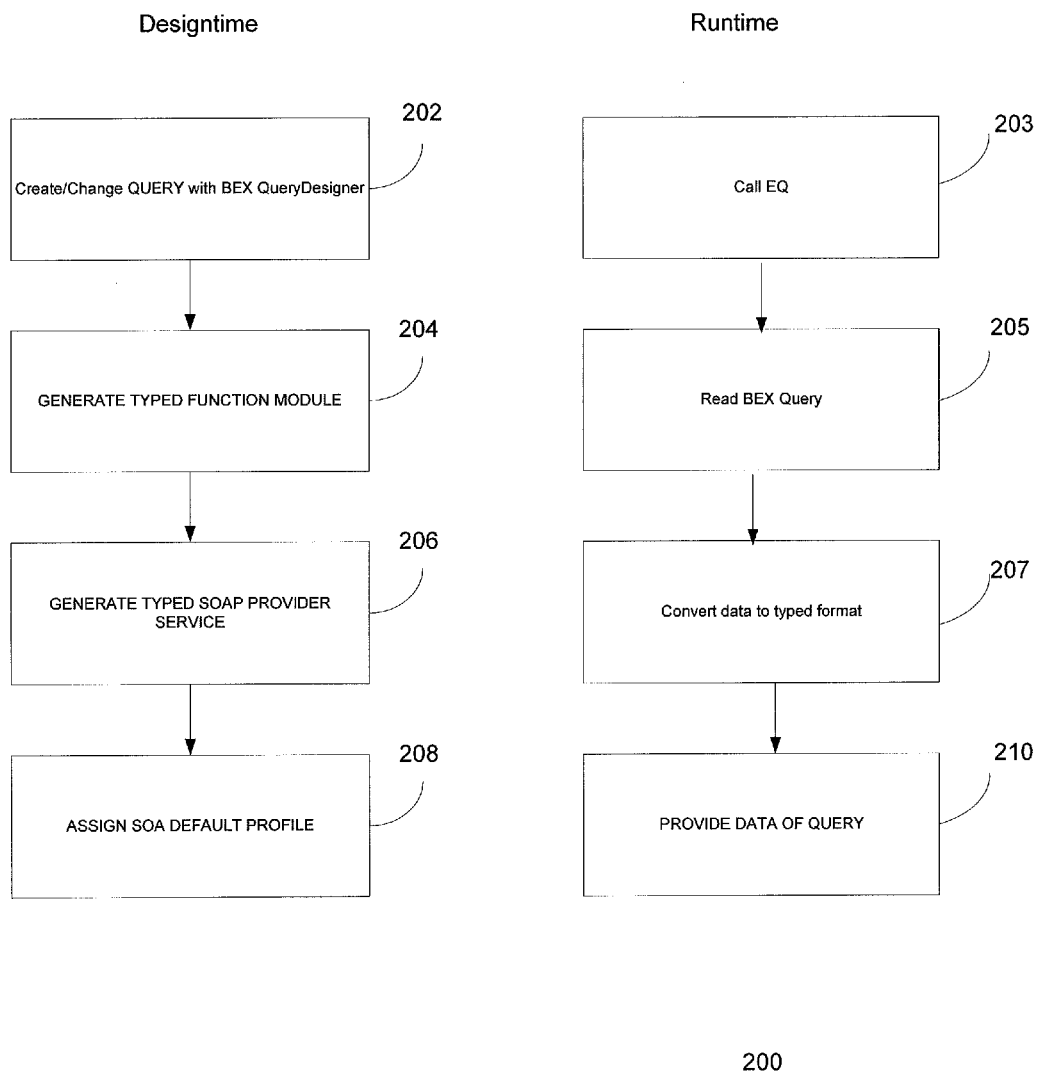
FIG. 2 is a process flow diagram illustrating aspects of a method having one or more features consistent with implementations of the current subject matter.

FIG. 2 shows process flow diagrams illustrating both the design time and runtime aspects of a method 200. At design time 202, a query is created or changed by someone who is allowed to create or change a BEx query. With saving the BEx query the system starts the EQ generation process if the EQ-flag 302 (shown in FIG. 3) is set. At 204, a typed function module is generated, and at 206 a typed SOAP provider service is generated. At 208, an SOA default profile is assigned, so that the business warehouse system can now receive queries from external consumers using protocols that are non-native to the business warehouse system. For the runtime aspect, an EQ call (203) reads the query (205), converts the query data into typed format (207) and provides the query data as a resultset (210).

Figure 3:
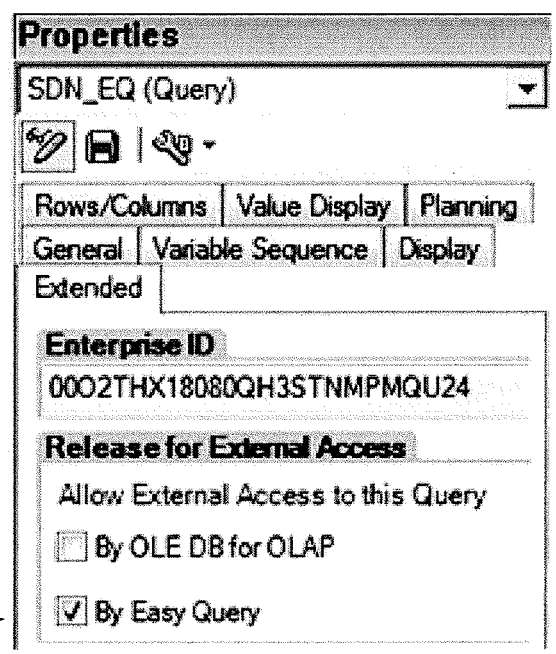
FIGS. 3 and 4 illustrate windows in a graphical user interface for easy query set-up and management.
Figure 4:
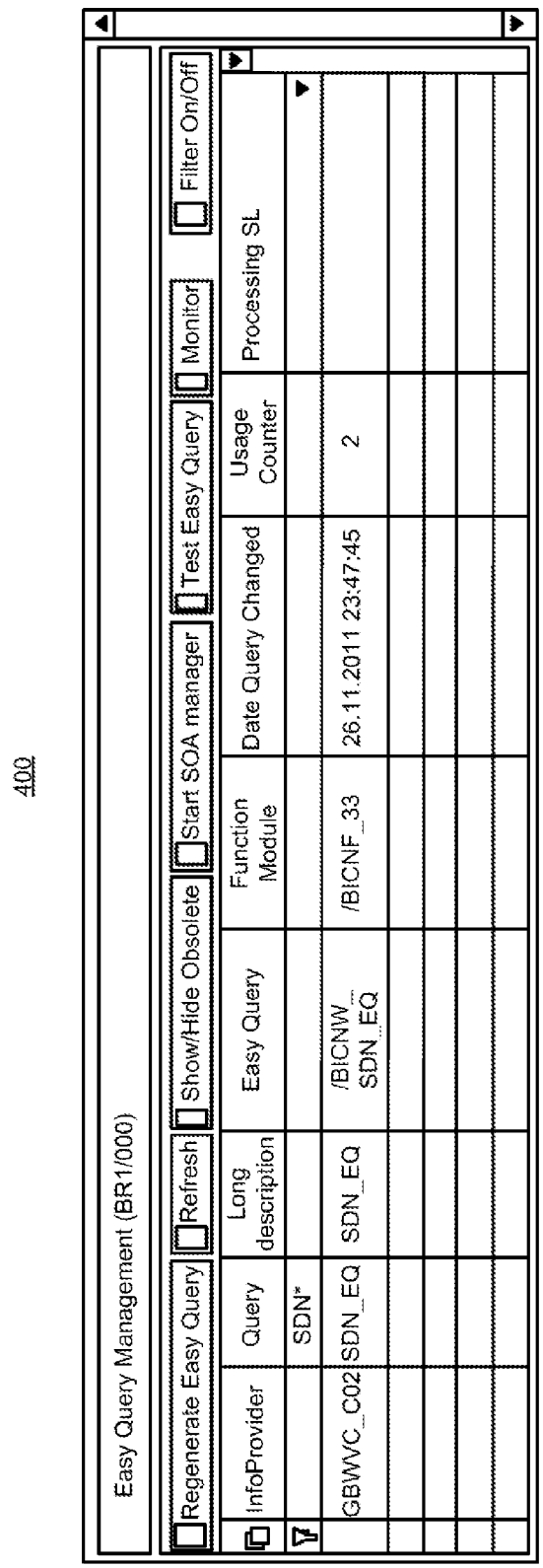

FIG. 3 illustrates a window 300 of a user interface, in which a user can choose or define a query as an EQ, by selecting an EQ option and marking a flag to be applied to the query. Once a query is marked as an EQ, a function module is generated in the BW back-end system. The name of the generated function module can be seen via a transaction manager window 400 of a user interface, as shown in FIG. 4.

As soon as the EQ function module has been generated in the business warehouse system, it is accessible from the gateway system. In analogy to the EQ flag of BW, the gateway system requires a manual step to expose services externally, i.e., the gateway flag exposes services for external access.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   creating, by one or more data processors, an access function at design time of a query by providing a set of access points to the query, the access points having a number of parameters that are fixed at the design time associated with the query, wherein the design time of the query includes a specification of one or more selectable properties of the query, the access function providing a generic application programming interface (API) to retrieve a query result to the query to a business warehouse system from one of a number of end-user systems external to the business warehouse system;
   writing, by one or more data processors, the query result in an end-user format into exporting parameters based on the end-user system, the end-user format varying between two end-user systems, wherein each access point provides access to a different end user format for the number of end-user systems, the access points providing access via at least a simple object access protocol (SOAP), a representational protocol (REST), and remote function call (RFC); and
   providing the query result in a format that hides complexity and provides the query result in a consumable generic format by each of the number of end-user systems.

2. The method in accordance with claim 1, wherein creating the access function includes providing a flag in a query to a business warehouse data system, the flag marking the query for access to the query by end-user systems external to the business warehouse data system.

3. The method in accordance with claim 2, wherein providing the set of access points to the query is according to the flag.

4. The method in accordance with claim 3, wherein creating the access function further includes providing the query result to the access points of the end-user systems external to the business warehouse system according to the number of parameters.

5. The method in accordance with claim 1, wherein the access points include an access point defined by a proprietary interface.

6. The method in accordance with claim 1, further comprising providing the query result in a tabular form.

7. The method in accordance with claim 6, wherein the tabular form includes a single table containing a flat and easily consumable representation of the result set.

8. A system comprising:
   at least one data processor;
   memory storing instructions which, when executed by the at least one data processor, causes the at least one data processor to implement an easy query function module that provides a set of access points to the query, the access points having a number of parameters that are fixed at the design time associated with the query, wherein the design time of the query includes a specification of one or more selectable properties of the query, the easy query function module accesses a generic application programming interface (API) to retrieve the query result to a query to a business warehouse system from one of a number of end-user systems external to the business warehouse system, and writes the query result in an end-user format into exporting parameters based on the end-user system, the end-user format varying between two end-user systems, wherein each access point provides access to a different end user format for the number of end-user systems, the access points providing access via at least a simple object access protocol (SOAP), a representational protocol (REST), and remote function call (RFC);
   the easy query function module being further configured to provide the query result in an format that hides complexity and provides the query result in a consumable generic format.

9. The system in accordance with claim 8, wherein the end-user format has a number of parameters that are fixed at a design time associated with the query.

10. The system in accordance with claim 8, wherein the easy query function module further provides a flag in a query to a business warehouse data system, the flag marking the query for access to the query by end-user systems external to the business warehouse data system.

11. The system in accordance with claim 10, wherein the easy query function module provides the set of access points to the query according to the flag.

12. The system in accordance with claim 11, wherein the easy query function module further provides the query result to the access points of the end-user systems external to the business warehouse system according to the number of parameters.

13. The system in accordance with claim 12, wherein the access points include an access point defined by a proprietary interface.

14. The system in accordance with claim 8, the easy query function module further provides the query result in a tabular form.

15. The system in accordance with claim 14, wherein the tabular form includes a single table containing a flat and easily consumable representation of the result set.

* * * * *